(12) United States Patent
Araki (10) Patent No.: US 11,632,064 B2
(45) Date of Patent: Apr. 18, 2023

(54) CONTACT MEMBER, VIBRATION ACTUATOR INCLUDING CONTACT MEMBER, AND APPARATUS INCLUDING VIBRATION ACTUATOR

(71) Applicant: CANON KABUSHIKI KAISHA, Tokyo (JP)

(72) Inventor: Yasuyuki Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 17/386,869

(22) Filed: Jul. 28, 2021

(65) Prior Publication Data

US 2022/0045630 A1    Feb. 10, 2022

(30) Foreign Application Priority Data

Aug. 6, 2020  (JP) .............................. JP2020-133876

(51) Int. Cl.
  *H02N 2/10* (2006.01)
  *B25J 15/00* (2006.01)
  *B22F 3/26* (2006.01)

(52) U.S. Cl.
  CPC .......... *H02N 2/103* (2013.01); *B25J 15/0019* (2013.01); *B22F 3/26* (2013.01)

(58) Field of Classification Search
  CPC ..... H02N 2/103; H02N 2/007; B25J 15/0019; B25J 9/10; B22F 3/26
  See application file for complete search history.

(56) References Cited

U.S. PATENT DOCUMENTS

| 5,523,150 A | * | 6/1996 | Numata ................. | C04B 41/88 428/614 |
| 9,039,891 B2 | * | 5/2015 | Ginestra ............... | B01J 23/883 208/108 |
| 10,530,277 B2 | | 1/2020 | Morita et al. | |
| 11,095,235 B2 | | 8/2021 | Araki | |
| 2020/0083822 A1 | | 3/2020 | Morita et al. | |

FOREIGN PATENT DOCUMENTS

JP     2017-225333 A    12/2017

* cited by examiner

*Primary Examiner* — Emily P Pham
(74) *Attorney, Agent, or Firm* — Venable LLP

(57) ABSTRACT

A contact member that makes it possible to reduce variations in characteristics of individual vibration actuators. The contact member is in contact with a vibration member. The contact member has a sintered body of metal powder as a base material. A contact surface of the sintered body, which is in contact with the vibration member, is formed by impregnated resin portions as pore portions of the sintered body in which resin has been impregnated, and non-impregnated as pore portions of the sintered body in which the resin has been impregnated. A ratio of the impregnated resin portions with respect to an entirety of the contact surface is 2% or more and 15% or less, and a ratio of the non-impregnated pore portions with respect to the entirety of the contact surface is 3% or more.

13 Claims, 6 Drawing Sheets

1ST VIBRATION MODE

FIG. 1C

2ND VIBRATION MODE

(INNER DIAMETER SIDE)   (OUTER DIAMETER SIDE)

☐ : IMPREGNATED RESIN PORTIONS
■ : METAL PORTIONS
▦ : NON-IMPREGNATED PORE PORTIONS

CONTACT MEMBER, VIBRATION ACTUATOR INCLUDING CONTACT MEMBER, AND APPARATUS INCLUDING VIBRATION ACTUATOR

BACKGROUND OF THE INVENTION

Field of the Invention

The present invention relates to a contact member that makes it possible to reduce variation in characteristics of individual vibration actuators and a vibration actuator including the contact member.

Description of the Related Art

In a vibration actuator, predetermined vibrations are excited in a vibration member to apply a frictional drive force from the vibration member to a contact member which is in contact with the vibration member, whereby the contact member is moved relative to the vibration member. The vibration actuator of this type is capable of maintaining a positional relationship between the vibration member and the contact member, when in a state in which the vibration member is not driven (non-energized state), by making use of a frictional force (holding force) generated between the vibration member and the contact member.

Here, as a material used for the contact member, Japanese Laid-Open Patent Publication (Kokai) No. 2017-225333 discloses a stainless sintered body in which resin having hard particles dispersed therein is impregnated. In this stainless sintered body, the impregnated resin contributes to improvement of wear resistance and maintenance of a high friction coefficient of the contact member at a friction sliding surface thereof on the vibration member, and the hard particles exhibit a spike effect, whereby the high friction coefficient is maintained even under a high-temperature and high-humidity environment.

In the contact member formed by the stainless sintered body described in Japanese Laid-Open Patent Publication (Kokai) No. 2017-225333, it is important that the resin is impregnated in pore portions in the friction surface at a proper ratio, for maintaining a stable friction coefficient and holding force. For this reason, if the ratio of the resin having hard particles mixed therein in the friction sliding surface varies in a step for manufacturing the contact member, the friction coefficient of the friction sliding surface varies. As a result, in a vibration actuator using such a contact member, there occur variations in various characteristics, such as holding force, power consumption, service life, driving accuracy, and so forth.

SUMMARY OF THE INVENTION

The present invention provides a contact member that makes it possible to reduce variations in characteristics of individual vibration actuators, a vibration actuator including the contact member, and an apparatus including the vibration actuator.

In a first aspect of the present invention, there is provided a contact member that is in contact with a vibration member, in a vibration actuator, wherein the contact member has a sintered body of metal powder as a base material, wherein a contact surface of the sintered body, which is in contact with the vibration member, includes impregnated resin portions as pore portions of the sintered body in which resin has been impregnated, and non-impregnated pore portions as pore portions of the sintered body in which the resin has not been impregnated, wherein a ratio of the impregnated resin portions with respect to an entirety of the contact surface is 2% or more and 15% or less, and wherein a ratio of the non-impregnated pore portions with respect to the entirety of the contact surface is 3% or more.

In a second aspect of the present invention, there is provided a vibration actuator including a vibration member, and the contact member according to the first aspect of the present invention, wherein predetermined vibrations are excited in the vibration member, whereby the contact member is moved relative to the vibration member.

In a third aspect of the present invention, there is provided an apparatus including the vibration actuator according to the second aspect of the present invention, and a component driven by the vibration actuator.

According to the present invention, it is possible to provide a contact member that makes it possible to reduce variations in characteristics of individual vibration actuators, a vibration actuator including the contact member, and an apparatus including the vibration actuator.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
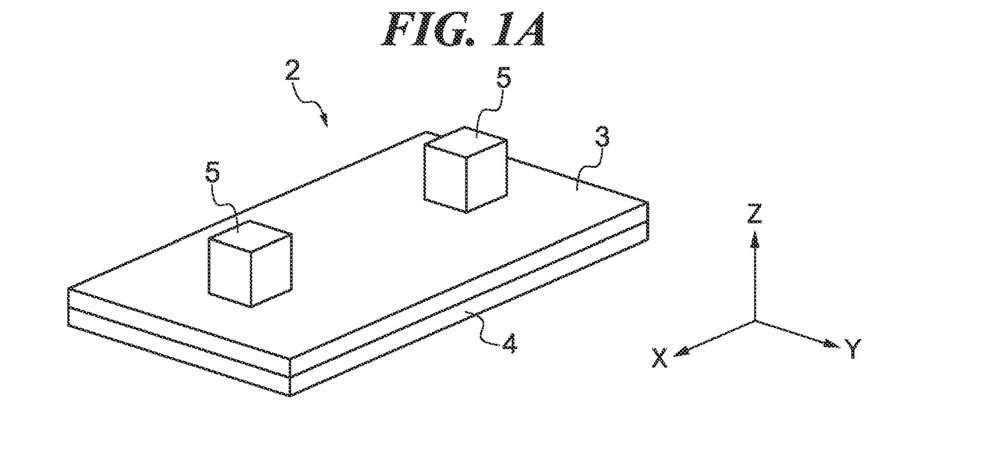
FIG. 1A is a schematic perspective view of a vibration member.

FIG. 1A is a schematic perspective view of a vibration member 2 as a component of a vibration actuator according to an embodiment of the present invention. The vibration member 2 has an elastic body 3 having a rectangular plate shape, a piezoelectric element 4 as an example of an electromechanical energy conversion element which is bonded to one surface of the elastic body 3, and two protruding portions 5 provided on the other surface of the elastic body 3 (surface opposite to the surface to which the piezoelectric element 4 is bonded). Note that an X-direction, a Y-direction, and a Z-direction, which are orthogonal to one another, are defined as shown in FIG. 1A for convenience of explanation.

Although not shown, the surface of the piezoelectric element 4, which is joined to the elastic body 3 (bonded surface), is formed with a common electrode (full-surface electrode), and the surface of the piezoelectric element 4 opposite to the surface joined to the elastic body 3 is formed with driving electrodes which are divided into two equal parts in a length direction (direction connecting between the two protruding portions 5). Further, a flexible printed circuit, not shown, is bonded to the surface of the piezoelectric element 4, which is formed with the driving electrodes, and AC voltages (driving voltages) can be applied to the driving electrodes via the flexible printed circuit.

Figure 1B:
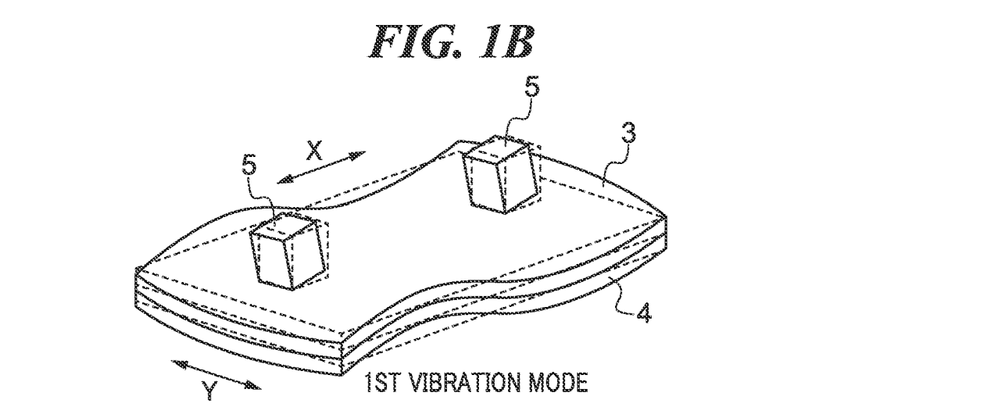
FIGS. 1B and 1C are views useful in explaining vibration modes excited in the vibration member.

FIG. 1B is a view useful in explaining a first vibration mode of two bending vibration modes excited in the vibration member 2. The first vibration mode is secondary bending vibration in a longitudinal direction (X-direction) of the vibration member 2 and has three node lines substantially parallel to a widthwise direction (Y-direction) of the vibration member 2. By applying AC voltages having a phase difference of 180° to the driving electrodes of the piezoelectric element 4 at a predetermined frequency, it is possible to excite the vibration of the first vibration mode in the vibration member 2. The protruding portions 5 are disposed at or in the vicinity of respective positions corresponding to nodes of the vibration of the first vibration mode and each caused to perform reciprocating motion in the X-direction by the vibration of the first vibration mode excited in the vibration member 2.

Figure 1C:
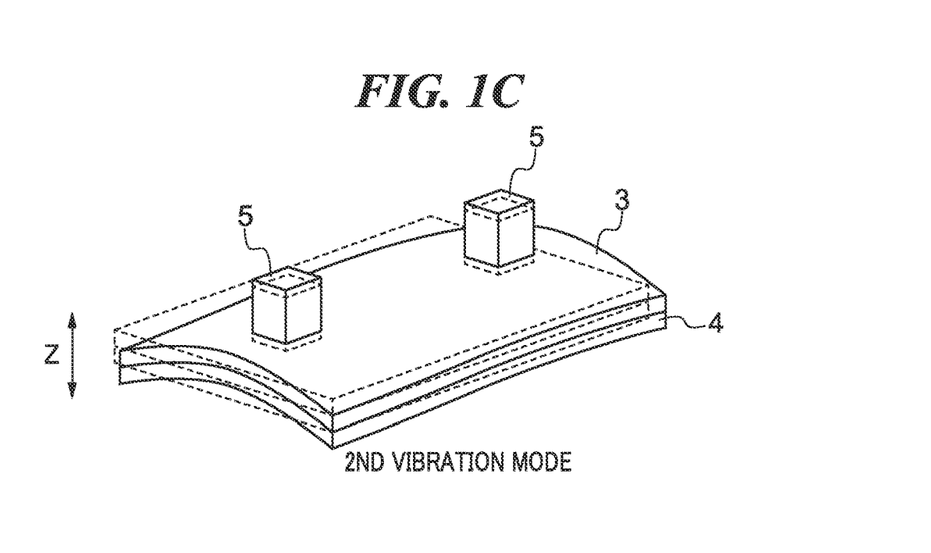

FIG. 1C is a view useful in explaining a second vibration mode of the two bending vibration modes excited in the vibration member 2. The second vibration mode is primary bending vibration in the widthwise direction (Y-direction) of the vibration member 2 and has two node lines substantially parallel to the longitudinal direction (X-direction) of the vibration member 2. By applying AC voltages having the same phase to the driving electrodes of the piezoelectric element 4 at a predetermined frequency, it is possible to excite the vibration of the second vibration mode in the vibration member 2. The protruding portions 5 are disposed at or in the vicinity of respective positions corresponding to antinodes of the vibration of the second vibration mode and each caused to perform reciprocating motion in an axial direction (Z-direction) thereof by the vibration of the second vibration mode excited in the vibration member 2.

The vibration member 2 is configured such that the node lines of the first vibration mode and the node lines of the second vibration mode are substantially orthogonal to each other within an X-Y plane. By exciting the vibrations of the first vibration mode and the second vibration mode in the vibration member 2 simultaneously and with a predetermined phase difference, it is possible to generate elliptical motion within a Z-X plane at the tip ends of the protruding portions 5.

Figure 2:
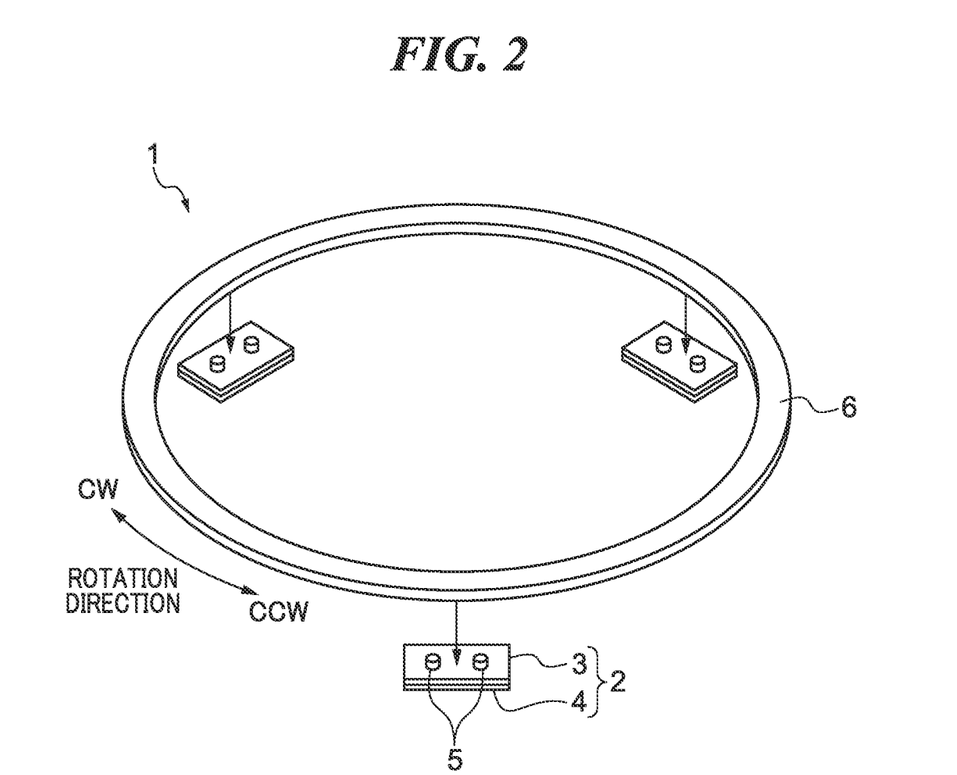
FIG. 2 is a schematic perspective view of a vibration actuator.

FIG. 2 is a schematic perspective view of a vibration actuator 1 using vibration members 2. The vibration actuator 1 includes the vibration members 2, and a contact member 6 having an annular shape and in contact with the vibration members 2. Note that the "contact member" refers to a member which has a friction sliding surface brought into contact with the vibration members 2 for receiving friction drive forces from the vibration members 2, and is moved relative to the vibration members 2 by vibrations generated in the vibration members 2. Although FIG. 2 shows the annular member as the contact member 6, the contact member 6 may have a disk shape. Further, a phrase of "moved relative to the vibration member" means not only that the vibration members are fixed and the contact member is moved (contact member is driven), but also that the contact member is fixed and the vibration members are moved (vibration members are driven).

In the vibration actuator 1, the vibration members 2, the number of which is three in the illustrated example, are arranged at equally-spaced intervals in a circumferential direction of the contact member 6 such that a virtual straight line connecting the two protruding portions 5 of each vibration member 2 is tangential to a circle concentric to an outer (or inner) peripheral circle of the contact member 6. The tip ends of the protruding portions 5 are brought into contact with the contact member 6 with a constant pressure force in a direction in which the protruding portions 5 protrude (Z-direction in FIG. 1). Further, the contact member 6 is rotatably supported by a support member, not shown. Therefore, when elliptical motion is generated at the tip ends of the protruding portions 5 by using the above-mentioned first vibration mode and second vibration mode, the contact member 6 receives a frictional driving force from the protruding portions 5 and is rotated in the circumferential direction.

Although it is possible to control in which rotation direction (a CW direction or a CCW direction), indicated by an arrowhead of an arrow in FIG. 2, the contact member 6 is to be rotated, by a phase difference between AC voltages applied to the piezoelectric element 4 of each vibration member 2, this method is known, and hence detailed description thereof is omitted. Further, in FIG. 2, illustration of the support member for rotatably supporting the contact member 6, a holding member for holding the vibration members 2, pressing means for bringing the vibration members 2 and the contact member 6 into contact with each other with the constant pressure force, and so forth, is omitted. Although in the present example, the vibration members 2 are fixed and the contact member 6 is rotatable, inversely, the contact member 6 may be fixed and the three vibration members 2 may be rotated together with the holding member and the like.

Next, a method of manufacturing the contact member 6 (manufacturing process) will be described. FIGS. 3A to 3D are schematic views useful in explaining the method of manufacturing the contact member 6. Here, the description will be given using a cross section of the contact member 6 taken in a radial direction (cross section appearing in a case where the contact member 6 is cut along a plane including a central axis of the contact member 6), and the left side and the right side as viewed in FIGS. 3A to 3D are an inner diameter side and an outer diameter side, respectively.

In the present embodiment, a sintered body 6a (see FIG. 3A) formed of martensite stainless steel corresponding to SUS420J2 is used for manufacturing the contact member 6. In other words, the base material of the contact member 6 is a sintered body of metal powder, and as the metal powder, considering wear resistance and so forth, the above-mentioned martensite stainless steel is suitably used.

The cross-sectional shape of the sintered body 6a is a substantially rectangular shape of which the four corners have been chamfered. Further, to suppress occurrence of burrs on the four corners, each chamfered portion is provided with a flat portion (surface orthogonal to a thrust direction of the contact member 6). Further, one surface of the contact member 6, which is in contact with the vibration members 2 (upper surface as viewed in FIG. 3A), is formed by a contact surface 6c (friction sliding surface) as a portion in contact with the vibration members 2 and a non-contact surface 6d which is not in contact with the vibration members 2. A recess portion 6b extending along the entire circumference of the contact member 6 is formed between the contact surface 6c and the non-contact surface 6d. Therefore, the contact surface 6c and the non-contact surface 6d are formed as discontinuous surfaces by arranging the recess portion 6d therebetween, such that the inner peripheral side forms the contact surface 6c and the outer peripheral side forms the non-contact surface 6d.

Figure 3A:
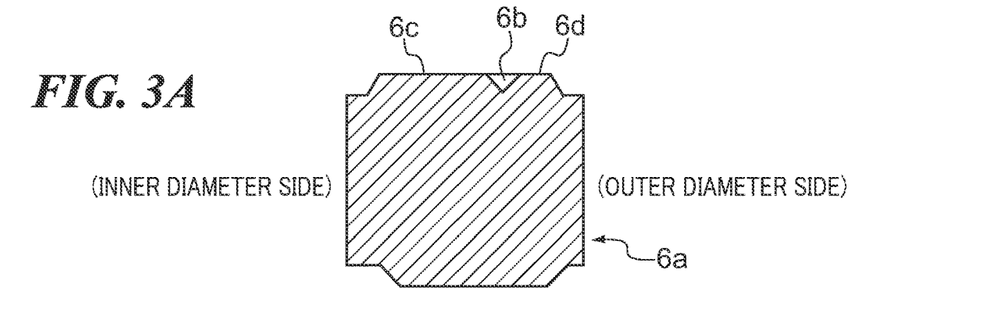
FIGS. 3A to 3D are schematic views useful in explaining a method of manufacturing a contact member.

The length of the contact surface 6c in the width (right-left direction as viewed in FIG. 3A (radial direction of the sintered body 6a)) is determined by taking dimension tolerance, an assembly error, and so forth of the sintered body 6a into account. Further, the recess portion 6b is formed to have a substantially V-shaped cross-section such that its width is narrower as it is deeper.

The inclination angle of the recess portion 6b is made gentle, and hence when applying resin, referred to hereinafter, the resin easily flows in the recess portion 6b. Further, since the recess portion 6b is formed in the circumferential direction, the resin flowing into part of the recess portion 6b flows in the recess portion 6b along the circumferential direction. As a result, the resin is easily impregnated in the whole recess portion 6b.

As a secondary effect, even in a case where the center of an application circle and the center of the sintered body 6a are displaced due to a low circularity of the sintered body 6a, the resin is easily impregnated over the entirety of the contact surface 6c through the recess portion 6b. Further, in a case where a fluorescent dye is added to the resin, it is possible to more easily verify whether or not the resin is properly impregnated over the entirety of the contact surface 6c, with which the protruding portions 5 of the vibration member 2 can be brought into contact, by observing the contact surface 6c using a fluorescence microscope. Further, by measuring the width of the recess portion 6b, it is possible to know a grinding amount and a polishing amount, referred to hereinafter, and estimate a ratio of impregnated resin portions and the like.

The sintered body 6a is manufactured by a process (sintering process) in which material powder as a mixture of a SUS410L powder and a carbon powder, which have a particle size of 150 μm or smaller, is molded into a predetermined shape e.g. by a press-molding method, and the resulting molded body is maintained at a predetermined temperature not higher than the melting point to thereby bond the two powders. The density of the sintered body 6a is approximately within a range of 6.1 to 6.6 g/ml ($6.1 \times 10^3$ to $6.6 \times 10^3$ kg/m$^3$).

The sintered body 6a is manufactured such that the Vickers hardness is equal to 550 HV0.2 or higher, desirably 600 HV0.2 or higher, so as to increase the wear resistance of the contact surface 6c. Adjustment of the Vickers hardness can be performed e.g. by sinter hardening in which a cooling speed within a sintering furnace is adjusted in the sintering process, or quenching of a sintered body, or the like. The sintered body 6a before being subjected to a resin impregnation process, described hereinafter, may be subjected to surface processing, such as plating or nitriding treatment. Note that the Vickers hardness of the sintered body 6a is measured by using the micro Vickers Hardness Tester with a testing force of 200 gf (=0.2 kgf) with respect to the surface of metal portions subjected to polishing, referred to hereinafter, so as to reduce the influence of empty holes in the sintered body 6a.

A resin impregnation process is performed on the prepared sintered body 6a so as to cause resin to be impregnated in pores in the sintered body 6a. The resin impregnation process includes a thermal permeation process and a hardening process, as described hereinafter.

In the present embodiment, a two-liquid curable adhesive is used as the resin, and more specifically, an adhesive is used which is comprised of an epoxy resin, as a main ingredient, of which a main component is in a liquid form, and an amine, as a hardening agent, of which a main component is in a liquid form. Further, a fluorescent dye is caused to be contained in the resin so as to make it possible to easily observe an impregnated state of the resin after the resin impregnation process. Furthermore, to increase the holding force of the vibration actuator 1 using the contact member 6, the resin impregnated in the sintered body 6a contains green carbide (GC) in a dispersed state as an example of hard particles. Note that the green carbide is SiC particles having very high purity and hardness.

Figure 3B:
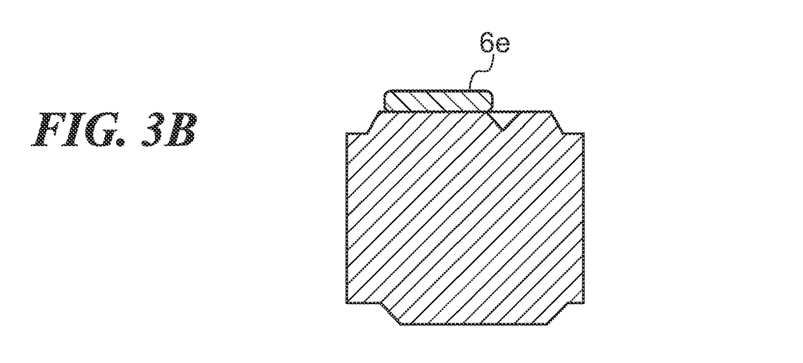

In the resin impregnation process, first, as shown in FIG. 3B, resin 6e is applied to substantially the entire area of the contact surface 6c which functions as the friction sliding surface when the contact member 6 is in use, using e.g. a dispenser device, not shown.

After that, a surface of the sintered body 6a, on which the resin 6e has not been applied (lower surface, as viewed in FIG. 3B (hereinafter referred to as the "reverse surface")), is brought into contact with a hot plate which has been heated to approximately 80° C. With this, the viscosity of the resin 6e is lowered by the heat transferred from the hot plate via the sintered body 6a, whereby filling of the resin 6e into the pores of the sintered body 6a is promoted (thermal permeation process).

Note that the hot plate refers to an instrument configured to heat a plate using a heater of an electric heating type as a heat source. Further, an oven, mentioned hereinafter, refers to an instrument configured to heat an object to be heated (heating target) in a closed space, and the atmospheric temperature in the oven and the temperature of the object to be heated become equal to each other in a steady state.

Figure 3C:
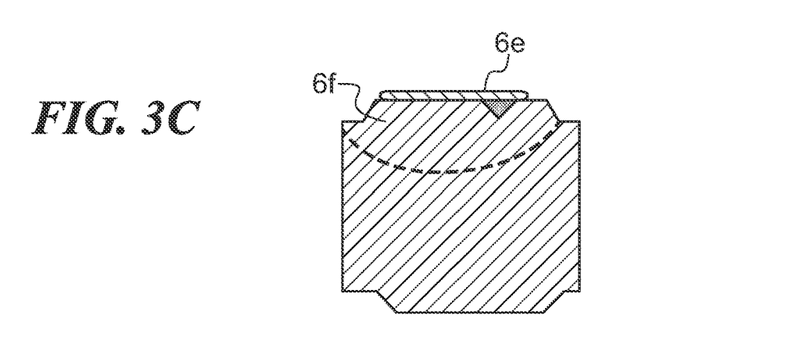
Figure 3D:
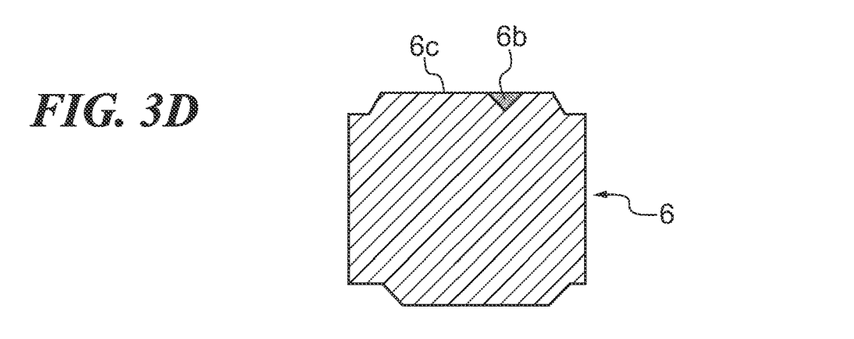

FIG. 3C is a diagram schematically showing a state in which after heating the sintered body 6a using the hot plate, the resin 6e has been permeated from the friction sliding surface to a certain depth indicated by a broken line and impregnated in the pores of the sintered body 6a. Hereafter, an area (part) of the sintered body 6a where the resin 6e has been permeated is referred to as the "resin impregnated part 6f". Note that the resin impregnated part 6f is in a state in which the resin 6e has been filled in part of a large number of pores.

In the present embodiment, to harden the resin 6e, the sintered body 6a including the resin impregnated part 6f is placed in the oven in which the internal temperature is set to approximately 80° C. and left for about 30 minutes. However, the resin 6e is also hardened at room temperature, and hence the use of the oven (hardening by heating) is not necessarily required. Further, the temperature set when the thermal permeation process is performed and the temperature set when hardening the resin 6e are not necessarily required to be equal, and the proper temperatures may be set according to the thermal properties and the hardening characteristics of the resin 6e.

In the process for impregnating the resin 6e into the sintered body 6a, an amount of the resin 6e to be applied to the contact surface 6c is made more than an amount of resin which can be actually permeated into the sintered body 6a. For this reason, after performing the process for hardening the resin 6e, the resin which has not been permeated into the sintered body 6a remains in the contact surface 6c in a hardened state. Further, the resin 6e applied to the contact surface 6c is reduced in viscosity when the thermal permeation process is performed, and hence as shown in FIG. 3C, the resin 6e sometimes flows into the recess portion 6b and further flows onto the non-contact surface 6d. If the resin 6e is hardened after that in this state, the resin 6e which has not been permeated into the sintered body 6a sometimes remains not only on the contact surface 6c, but also in the recess 6b and on the non-contact surface 6d.

Next, the hardened resin 6e remaining on the contact surface 6c and so forth is removed, and the front and reverse surfaces of the sintered body 6a are subjected to grinding so as to correct the degrees of flatness of the non-contact surface 6d and the reverse surface of the sintered body 6a, and the thickness of the sintered body 6a as the contact member 6, to predetermined values, and further to polishing so as to adjust surface roughness and the like of the front and reverse surfaces of the sintered body 6a. With this, it is possible to obtain the contact member 6 shown in FIG. 3D. Polishing can be performed e.g. by using a copper surface plate and free abrasive grains of diamond (3 µm), but this is not limitative. Grinding can be performed by using a commercially available grinding machine.

Figure 4A:
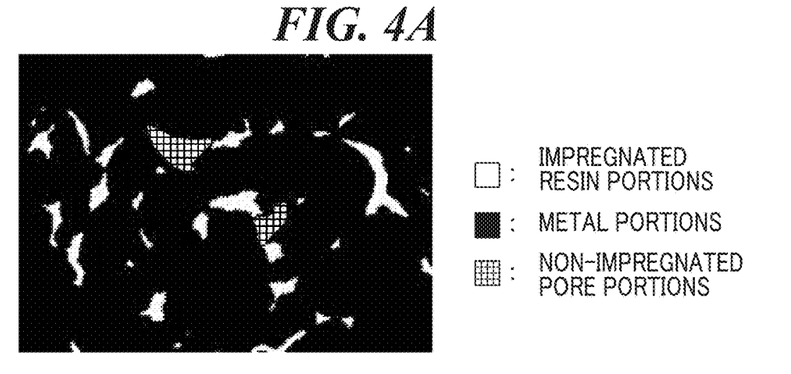
FIG. 4A is a view showing a structure of a contact surface of the contact member.

FIG. 4A is a view showing a structure (microstructure) of the contact surface 6c of the contact member 6, obtained as described above. The view of FIG. 4A is generated by performing image processing in which an image of the contact surface 6c of the contact member 6 shot by a fluorescence microscope is binarized such that resin portions are represented in white and portions other than the resin portions are represented in black, and further performing image processing in which a lattice pattern image is fitted in each pore where the resin is not filled. Note that the image (shape) of the pore portions can be obtained by shooting the same range using a metallurgical microscope. The shooting magnification is set to 200 times, and the observing range (shooting area) is set to a rectangular area of approximately 363 µm×272 µm.

The contact surface 6c of the contact member 6 is formed by "metal portions" of the sintered body 6a, "impregnated resin portions" as pore portions of the sintered body 6a in which resin has been impregnated, and "non-impregnated pore portions" as pore portions of the sintered body 6a in which resin has not been impregnated. The impregnated resin portions and the non-impregnated pore portions form the pore portions of the sintered body 6a. That is, the sum of the respective ratios (%) of the metal portions, the impregnated resin portions, and the non-impregnated pore portions, with respect to the entire contact surface 6c of the contact member 6, is equal to 100%. Further, the sum of the respective ratios of the pore portions and the metal portions of the sintered body 6a is equal to 100%. That is, the sum of the respective ratios of the impregnated resin portions and the non-impregnated pore portions is equal to the ratio of the pore portions of the sintered body 6a.

Note that in the following description, the respective ratios of the metal portions, the impregnated resin portions, and the non-impregnated pore portions each refer to a ratio of an area of thereof in the whole contact surface 6c, unless otherwise specifically referred to. On the other hand, in a case where the ratios refer to those of the impregnated resin portions and the non-impregnated pore portions with respect to all pore portions, they are specifically described as such.

Figure 4B:
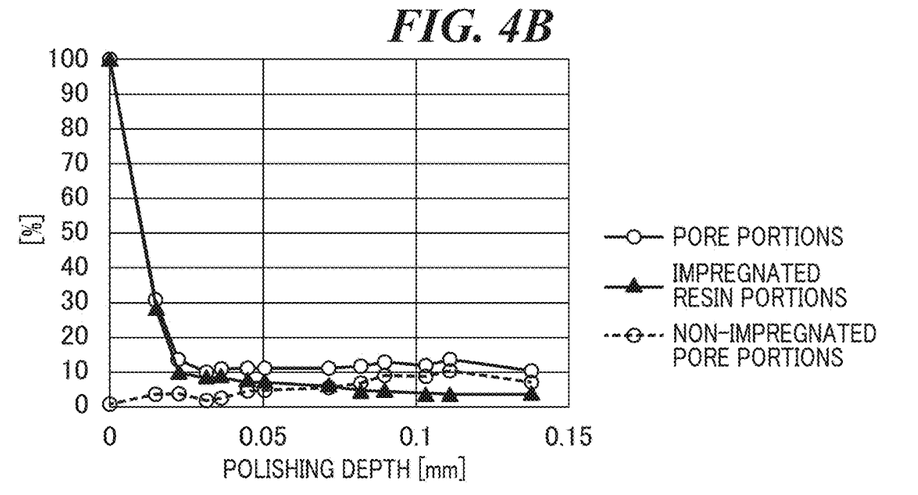
FIGS. 4B and 4C are diagrams each showing respective ratios of pore portions, impregnated resin portions, and non-impregnated pore portions in the contact surface, which vary in a depth direction.

In the present embodiment, the pore portions of the sintered body 6a are different in size depending on the location, but each have a maximum length in a range of approximately several µm to 100 µm. FIG. 4B is a diagram showing a result obtained by measuring the respective ratios of the pore portions, the impregnated resin portions, and the non-impregnated pore portions, at one location in the contact surface 6c, by varying the shooting area in a depth direction of the contact surface 6c. The ratio of the pore portions at a specific depth of the contact surface 6c is calculated using an image obtained by shooting a shooting area prepared by polishing the contact member 6 to the specific depth at a magnification of 200 times using the metallurgical microscope. Therefore, the ratios of the impregnated resin portions and the non-impregnated pore portions, and the ratio of the pore portions as the sum of these, mentioned here, each refer to a ratio in the observed surface, i.e. a ratio of areas thereon. The observation range (shooting area) at this time is set to a rectangular area of approximately 363×272 µm.

Note that the entire observed surface at a polishing depth of 0 µm is formed only by the hardened resin 6e (the ratio of the metal portions is 0%), and hence the ratio of the pore portions is set to 100% for convenience sake. Further, note that polishing scratches which are several µm or less deep, caused by abrasive grains used for polishing, are not counted as the pores. Since the fluorescent dye is contained in the resin 6e, when the contact surface 6c is observed using a fluorescent microscope, only the resin portions emit light. By using this phenomenon, the ratio of the impregnated resin portions is calculated based on an image obtained by observing and shooting the same range using the fluorescent microscope. Note that the method of calculating the ratio of the impregnated resin portions is not limited to this, but for example, the ratio of the impregnated resin portions may be calculated e.g. based on an image obtained by using a laser microscope and depth data.

As shown in FIG. 4B, the ratio of the pore portions drastically decreases in a range of a polishing start surface to a depth of approximately 30 µm and is substantially constant at a polishing depth of 30 µm or more. That is, the ratio of pore portions at the polishing depth of 30 µm is equivalent, for example, to a ratio of pore portions on a surface further polished by 10 µm in the depth direction. Here, the term "equivalent" means that a difference between the two ratios of the pore portions is 5% or smaller. The phenomenon that the ratio of pore portions changes is considered to be caused because in a depth range of approximately 0 to 30 µm, forming the outermost layer of the sintered body 6a, necks formed by the sintering powder particles connected to each other are less formed, and as the polishing depth is deeper, more necks appear. In other words, in the observed surface at a polishing depth of 30 µm or more, basically, all sintering powder particles are connected to each other to form necks.

As the polishing depth becomes deeper from the polishing start surface, the ratio of the impregnated resin portions becomes smaller, and particularly, largely changes within a range from the polishing start surface to a depth of approximately 30 µm. The ratio of the impregnated resin portions is 100% at a polishing depth of 0 µm, but becomes approximately 27% at a polishing depth of 15 µm, and becomes approximately 10% or less at a polishing depth of 30 µm or more. As the cause of this, it is considered that necks formed by the sintering powder particles connected to each other are less formed in a range of the polishing depth from the polishing start surface to approximately 30 µm, and closed pore portions where outside air does not pass and resin is not filled appear at a depth larger than a certain depth. Further, as the cause of the above-mentioned change in the ratio of the impregnated resin portions, it is considered that filling of the resin in large-volume pore portions existing at locations remote from the polishing start surface in the depth direction is not completed and the resin flows in the depth direction, or the resin is peeled off from the pore portions during polishing.

However, when the polishing depth reaches 30 μm or more, the change in the ratio of the impregnated resin portions becomes small. As the ratio of the impregnated resin portions is larger, it is more advantageous in the holding force and the starting performance, but the power consumption becomes larger. For this reason, in the contact surface 6c of the contact member 6, the ratio of the impregnated resin portions is set to be 15% or less, desirably 10% or less. Note that if the ratio of the impregnated resin part is too small, a sufficient holding force and starting performance cannot be obtained, and hence the ratio of the impregnated resin portions is set to 2% or more.

On the other hand, the ratio of the non-impregnated pore portions becomes larger as the polishing depth becomes deeper from the polishing start surface, and is less than 2% at a polishing depth of 30 μm, but becomes 4% or more at a polishing depth of 50 μm and 6% or more at a polishing depth of 100 μm or more. However, the ratio of the non-impregnated pore portions is substantially constant at the polishing depth of 100 μm or more.

If a certain amount or more of the non-impregnated pore portions exist, wear powder generated by sliding between the contact member 6 and the vibration members 2 during driving of the vibration actuator 1 tends to be easily received in the non-impregnated portions. This makes it possible to prevent the wear powder from acting as polishing powder during driving of the vibration actuator 1 and thereby improve the wear resistance.

Note that in the vibration actuator 1, as the depth to which the contact member 6 wears (allowable depth of wear), a depth of 2 μm or less is assumed. A separate test shows that, to obtain this characteristic, it desirable that the ratio of the non-impregnated pore portions is set to 3% or more. As mentioned hereinabove, it is desirable that the ratio of the impregnated resin portions is 15% or less. In other words, assuming that the ratio of all pore portions is 100%, it can be said that it is desirable that the ratio of the non-impregnated pore portions is 20% or more and the ratio of the impregnated resin portions is less than 80%, with respect to all pore portions.

On the other hand, it is desirable that the ratio of the non-impregnated pore portions with respect to all pore portions is 30% or less. This is because if the ratio of the non-impregnated pore portions is too large, cracking or chipping may occur in the metal portions of the contact member 6 when sliding on the vibration members 2. To form a certain ratio or more of the non-impregnated pore portions, the sintered body 6a is required to have a hardness equal to a certain value or higher. This is because in a sintered body having a hardness lower than the certain value, plastic flow of the metal portions (phenomenon that the metal portions flow as if the shape of the surface thereof melts) is liable to occur during working of polishing, which increases the ratio of the metal portions in the surface and reduces the area of the pore portions.

Further, it is necessary to select a polishing method suitable for the polishing process. This is because, depending on the polishing method, how a force or heat is applied is different so that the liability of the above-mentioned plastic flow of the metal portions is different.

It is desirable that the average area per one non-impregnated pore portion is larger than the average area per one impregnated resin portion. Further, it is desirable that one or more non-impregnated pore portions each having an area of 300 μm² or larger exist in a range of approximately 363 μm×272 μm which is set as the observation range (shooting area). This makes it possible to suppress clogging (full filling) of wear powder in the non-impregnated pore portions, which is caused during driving of the vibration actuator 1, thereby sustainably causing the wear powder to be received in the non-impregnated pore portions.

Incidentally, the density measured with respect to a sintered body manufactured similar to the sintered body 6a is 6.3 g/ml, and the density of the sintered body 6a can be regarded to be equal to this. Note that density measurement is performed by using the Archimedes method. The density of a molten material of SUS420J2 is 7.75 g/ml, and hence the porosity of the sintered body 6a is approximately 19%.

In a case where the sintered body 6a has a density of 6.3 g/ml as mentioned above, even when the ratio of the non-impregnated pore portions increases, insofar as the necessary impregnated resin portions remain, there is no substantial lowering of characteristics, such as the friction coefficient and the wear resistance. However, in a case where the density of the sintered body 6a is lower than 6.1 g/ml (the porosity exceeds 21.3%), necks formed by the sintering powder particles connected to each other are insufficiently formed, and hence there is a fear that the sintering powder drops off during driving of the vibration actuator 1, causing lowering of the wear resistance. Therefore, it is desirable that the porosity of the sintered body 6a is equal to 21% or lower.

Figure 4C:
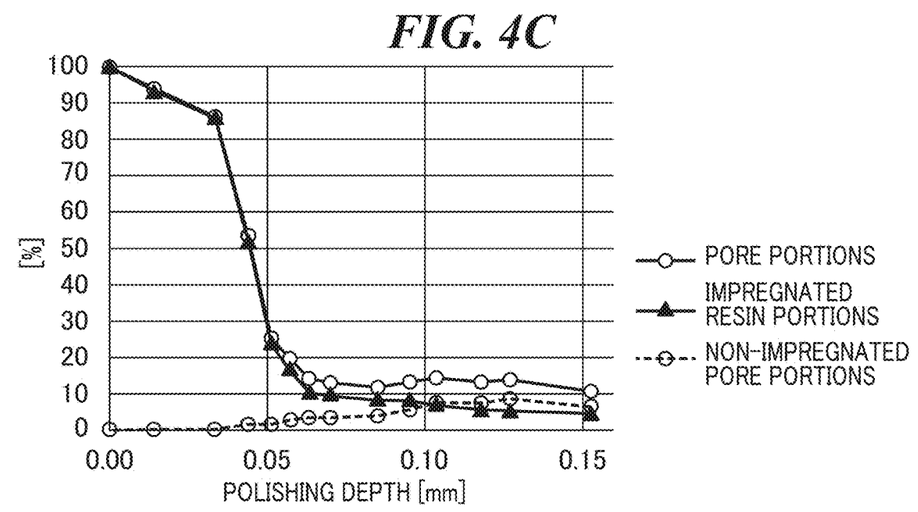

FIG. 4C is a diagram showing a result obtained by measuring the ratio of the pore portions at 12 locations set at angular intervals of 30° in the circumferential direction, by varying the shooting area in the depth direction of the contact surface 6c, and calculating an average value of measured values of the ratio. In the sintered body 6a before impregnating resin, the flatness of the upper surface, as viewed in FIG. 3A, including the contact surface 6c and the non-contact surface 6d is generally approximately 0 to 100 μm. The result shown in FIG. 4C is obtained by performing the resin impregnation process, described with reference to FIGS. 3A to 3D, using the sintered body 6a having a flatness of 42 μm. When polishing is started, the contact surface 6c is changed from a state entirely covered with the resin to a state in which the metal surface partially appears therefrom.

As polishing further proceeds, when the polishing depth reaches approximately 57 μm, the metal (sintering powder) appears on the entire polished surface. However, at this time point, the ratio of the impregnated resin portions is 17%, and the ratio of the non-impregnated pore portions is lower than 3%, and hence the wear resistance is not sufficient and the power consumption may be large. As polishing further proceeds, when the polishing depth reaches 70 μm or more, a surface exhibiting excellent characteristics as the friction sliding surface of the contact member 6 is obtained in which the ratio of the impregnated resin portions is equal to 10% or lower and the ratio of the non-impregnated pore portions is equal to 3.5% (the ratio of the non-impregnated pore portions is 27% assuming that the ratio of the whole pore portions is set as 100%).

Further, when the polishing depth reaches 85 μm, the ratio of the non-impregnated pore portions is equal to 3.7%, and the ratio of the non-impregnated pore portions with respect to all pore portions is equal to 31%. Further, when the polishing depth reaches 95 μm, the ratio of the non-impregnated pore portions is equal to 5.3%, and the ratio of the non-impregnated pore portions with respect to all pore portions is 39%.

From the above, the minimum polishing amount required in a case where the vibration actuator 1 uses the whole circumference of the contact surface 6c as the friction sliding surface against the vibration members 2 is 70 μm for the sintered body 6a having given the result shown in FIG. 4C, which is a value obtained by adding 30 μm to the flatness of the sintered body 6a.

As described above, by performing polishing on the sintered body subjected to the resin impregnation process to a certain extent or more (a certain depth or more), a contact member is obtained which uses, as the friction sliding surface, an area in which the respective ratios of the metal portions, the resin impregnated portions, and the non-impregnation pore portions have less variation and are equal to desired values. This makes it possible to reduce variation in performance, such as the friction coefficient and the wear resistance, caused e.g. due to variation in the flatness and the polishing amount between individual contact members, and thereby reduce variation in characteristics between individual vibration actuators.

Next, a description will be given of an image capturing apparatus and an industrial robot as examples of an apparatus to which the vibration actuator 1 using the above-described contact member 6 is applied.

Figure 5A:
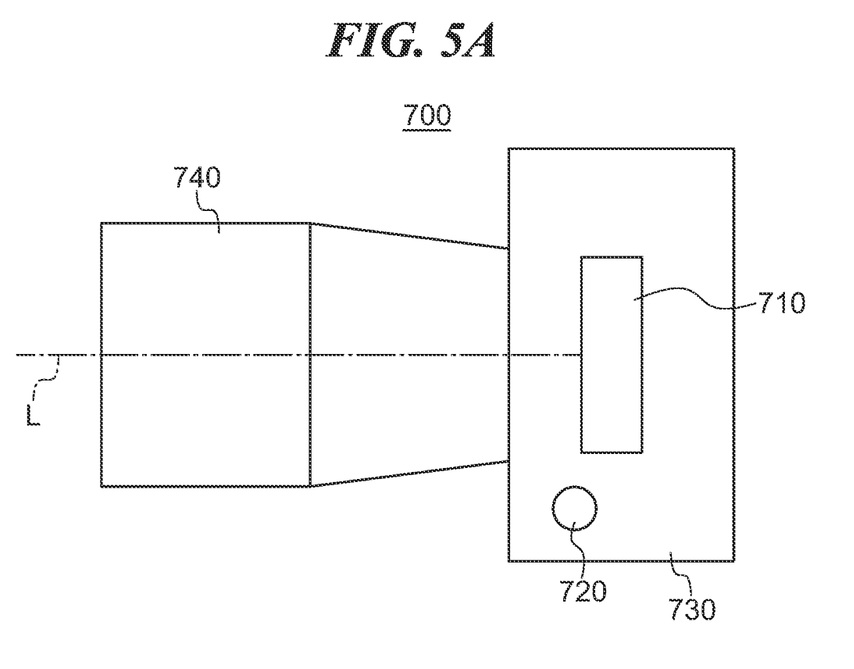
FIGS. 5A and 5B are views schematically showing the configuration of an image capturing apparatus including the vibration actuator.

FIG. 5A is a top view schematically showing the configuration of an image capturing apparatus 700 (apparatus). The image capturing apparatus 700 includes a camera body 730 having an image capturing device 710 and a power button 720 mounted thereon. Further, the image capturing apparatus 700 includes a lens barrel 740 including a lens group and a vibration actuator, neither of which is shown in FIG. 7A. The lens group is driven by the vibration actuator. The lens barrel 740 can be replaced as an interchangeable lens for the camera body 730, and the lens barrel 740 suitable for an object to be shot can be attached to the camera body 730. As the vibration actuator, the vibration actuator 1 described with reference to FIG. 2 can be used.

Although driving of the lens performed by the vibration actuator is considered to be suitable for driving an auto-focus lens, this is not limitative, but a zoom lens can also be suitably driven by the same configuration. Further, the vibration actuator can also be used for driving an image capturing device and driving a lens or an image capturing device for image blur correction.

Figure 5B:
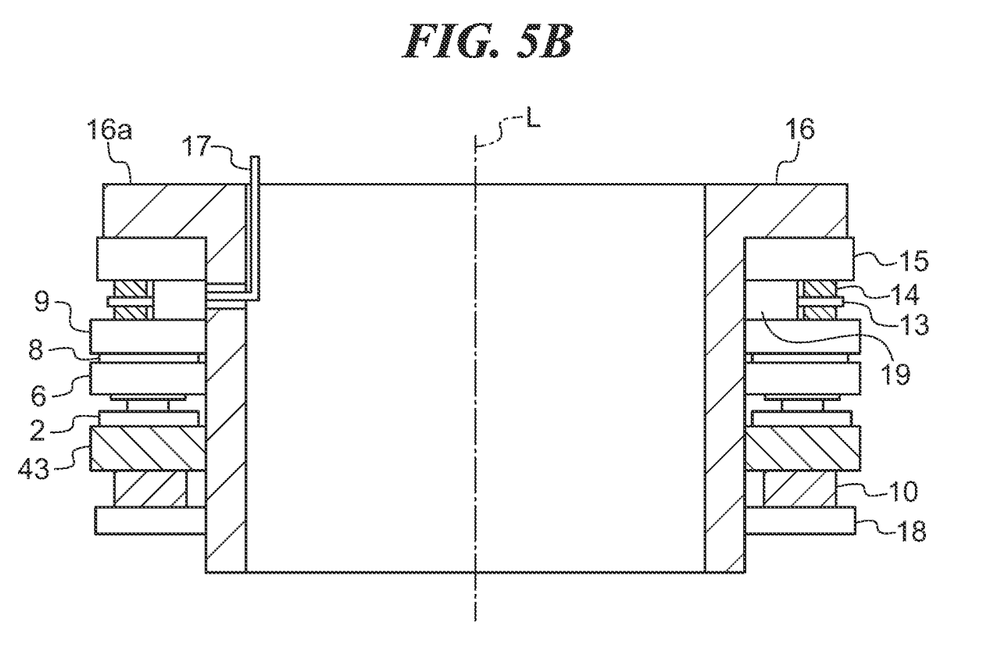

FIG. 5B is a schematic cross-sectional view of an example of the configuration in which the vibration actuator 1 is mounted in the lens barrel 740, which is taken along an optical axis L. The contact member 6 is arranged such that the contact surface 6c (reference numeral is omitted in FIG. 5B) is in contact with the protruding portions 5 (reference numeral is omitted in FIG. 5B) of the vibration member 2. The surface of the contact member 6, opposite to the contact surface 6c, is provided with an output transfer member 9 with a rotor rubber (anti-vibration rubber) 8 interposed between the opposite contact surface and the output transfer member 9.

On the other hand, a holding base 43 for holding the vibration member 2 such that vibrations are not obstructed has a leaf spring 10 provided on a side opposite to the contact member 6, as pressure means for pressing the vibration member 2 against the contact member 6 with a predetermined force. Further, to compress the leaf spring 10 to generate a pressing force, a pressure ring 18 for regulating a bending amount of the leaf spring 10 is provided such that the leaf spring 10 is sandwiched and held between the pressure ring 18 and the holding base 43. Thus, a proper pressing force is applied between the vibration member 2 and the contact member 6.

A barrel unit body 16 is formed with a flange 16a protruding perpendicular to an optical axis direction (direction in which the optical axis L extends), and a manual ring 15 for performing manual focusing is manually rotatably disposed on one surface of the flange 16a. Further, a roller ring 19 which can be rotated by a rotating operation of the manual ring 15 or an output transferred from the vibration actuator 1 is disposed between the manual ring 15 and the vibration actuator 1. When the roller ring 19 is rotated, a cam ring and the like are rotated via an output key 17 provided on the roller ring 19.

The roller ring 19 is formed with roller shafts 13 at a plurality of positions such that they radially extend, and driven rollers 14 are mounted on the roller shafts 13 such that they are rotatable about the associated roller shafts 13, respectively. The output transfer member 9 and the manual ring 15 are stacked in the optical axis direction with the driven rollers 14 interposed therebetween. An inner peripheral side of the pressure ring 18 is engaged with the barrel unit body 16 with screws or a bayonet structure. By rotating the pressure ring 18 to move the same in the optical axis direction, it is possible to adjust the compressing amount of the leaf spring 10. Thus, the components from the holding base 43 via the manual ring 15 to the flange 16a are held sandwiched under pressure.

When the vibration actuator 1 is driven, the contact member 6 is rotated about the optical axis L, whereby the contact member 6, the rotor rubber 8, and the output transfer member 9 are rotated about the optical axis L in unison. Then, the driven rollers 14 which are in contact with the output transfer member 9 are rotated about the optical axis L together with the roller ring 19 while rolling on the surface of the manual ring 15, and the cam ring and the like, not shown, are rotated by the output key 17 disposed on the roller ring 19, whereby an auto focus operation or the like is performed.

Figure 6:
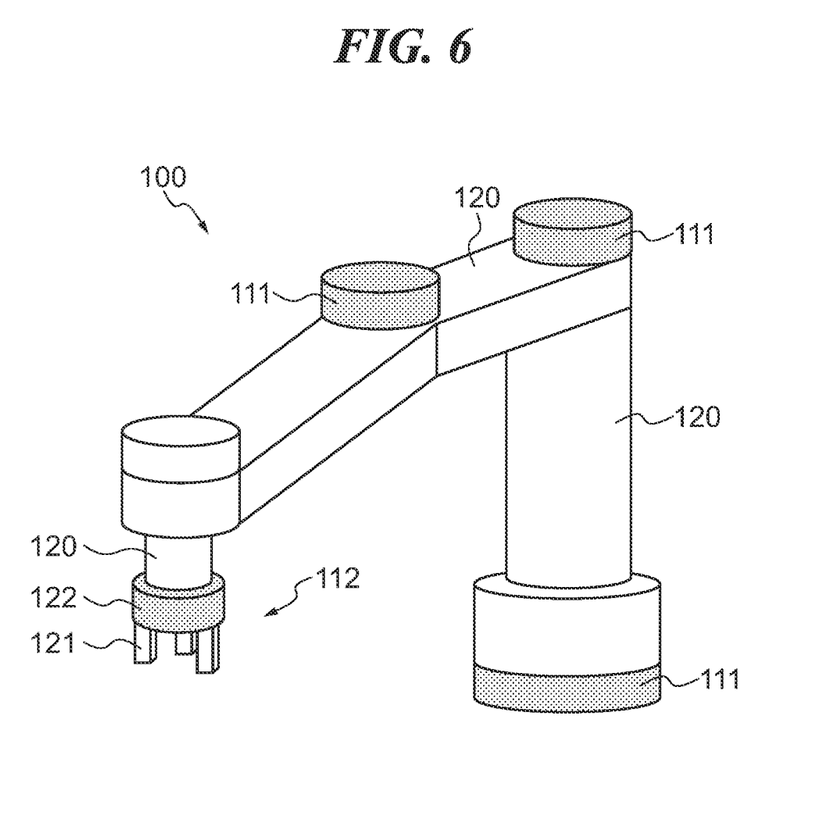
FIG. 6 is a schematic perspective view of a robot including the vibration actuator.

FIG. 6 is a schematic perspective view of a robot 100 (apparatus) having the vibration actuators 1 mounted thereon, and the example illustrated here is a horizontal multi-articulated robot as a type of industrial robot.

The robot 100 includes arm joint sections 111 and a hand section 112. Each arm joint section 111 connects two arms 120 such that an angle at which the two arms 120 intersect each other can be changed. The hand section 112 has an arm 120, a holding section 121 attached to one end of the arm 120, and a hand joint section 122 that connects the arm 120 and the holding section 121. The vibration actuator 1 is incorporated in each of the arm joint sections 111 and the holding section 121 to perform angle adjustment and a rotational operation of each of the arms 120 and the hand joint section 122.

Note that a vibration actuator having TN characteristics (drooping characteristics indicating a relationship between a load torque and a rotational speed) showing a low rotational speed and a high torque is suitably used for a bending operation of each arm join section 111 and a holding operation of the hand section 112.

The present invention has been described heretofore based on the embodiments thereof. However, the present invention is not limited to these embodiments, but it is to be understood that the invention includes various forms within the scope of the gist of the present invention. For example, in the above-described embodiment, although the present invention is applied to the contact member having the annular shape, the present invention can be applied to a contact member having a linear shape (bar shape) or a flat shape. It is possible to realize a linear drive type vibration actuator by using a linear-shaped contact member. Further, as a device which can drive a flat-shaped contact member in a desired direction within a plane, there can be mentioned an XY stage. Although in the above-described embodiment, the contact member is manufactured using a stainless powder sintered body, this is not limitative, but it is possible to manufacture the contact member according to the present invention using a stainless steel molten material having holes formed in its surface e.g. by blast processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-133876, filed Aug. 6, 2020, which is hereby incorporated by reference herein in its entirety.

What is claimed is:

1. A contact member that is in contact with a vibration member, in a vibration actuator,
wherein the contact member has a sintered body of metal powder as a base material,
wherein a contact surface of the sintered body, which is in contact with the vibration member, comprises:
impregnated resin portions as pore portions of the sintered body in which resin has been impregnated; and
non-impregnated pore portions as pore portions of the sintered body in which the resin has not been impregnated,
wherein a ratio of the impregnated resin portions with respect to an entirety of the contact surface is 2% or more and 15% or less, and
wherein a ratio of the non-impregnated pore portions with respect to the entirety of the contact surface is 3% or more.

2. The contact member according to claim 1, wherein the ratio of the impregnated resin portions with respect to the entirety of the contact surface is 10% or less.

3. The contact member according to claim 1, wherein a ratio of the non-impregnated pore portions with respect to an entirety of the pore portions is 20% or more.

4. The contact member according to claim 1, wherein a ratio of the non-impregnated pore portions with respect to an entirety of the pore portions is 30% or less.

5. The contact member according to claim 1, wherein the contact surface of the sintered body is formed with necks.

6. The contact member according to claim 1, wherein a difference between a ratio of the pore portions with respect to the entirety of the contact surface and a ratio of the pore portions at a depth of 10 μm from the contact surface is 5% or less.

7. The contact member according to claim 1, wherein the Vickers hardness of the sintered body is equal to 550 HV0.2 or higher.

8. The contact member according to claim 1, wherein in the contact surface, an area of the non-impregnated pore portions is larger than an area of the impregnated resin portions.

9. The contact member according to claim 1, wherein at least part of the non-impregnated pore portions has an area of 300 μm$^2$ or more.

10. The contact member according to claim 1, wherein the sintered body is a sintered body of martensite stainless steel having a grain size of 150 μm or smaller and a density of 6.1 to 6.6 g/ml, and
wherein the resin is epoxy resin containing hard particles.

11. A vibration actuator including:
a vibration member; and
a contact member in contact with the vibration member,
wherein the contact member has a sintered body of metal powder as a base material,
wherein a contact surface of the sintered body, which is in contact with the vibration member, comprises:
impregnated resin portions as pore portions of the sintered body in which resin has been impregnated; and
non-impregnated pore portions as pore portions of the sintered body in which the resin has not been impregnated,
wherein a ratio of the impregnated resin portions with respect to an entirety of the contact surface is 2% or more and 15% or less, and
wherein a ratio of the non-impregnated pore portions with respect to the entirety of the contact surface is 3% or more, and
wherein predetermined vibrations are excited in the vibration member, whereby the contact member is moved relative to the vibration member.

12. The vibration actuator according to claim 11, wherein the contact member is linear-shaped, flat-shaped, annular-shaped, or disc-shaped.

13. An apparatus including:
a vibration actuator; and
a component driven by the vibration actuator,
the vibration actuator including:
a vibration member; and
a contact member in contact with the vibration member,
wherein the contact member has a sintered body of metal powder as a base material,
wherein a contact surface of the sintered body, which is in contact with the vibration member, comprises:
impregnated resin portions as pore portions of the sintered body in which resin has been impregnated; and
non-impregnated pore portions as pore portions of the sintered body in which the resin has not been impregnated,
wherein a ratio of the impregnated resin portions with respect to an entirety of the contact surface is 2% or more and 15% or less, and
wherein a ratio of the non-impregnated pore portions with respect to the entirety of the contact surface is 3% or more, and
wherein predetermined vibrations are excited in the vibration member, whereby the contact member is moved relative to the vibration member.

* * * * *